(12) United States Patent
Purkayastha (10) Patent No.: US 11,450,904 B2
(45) Date of Patent: Sep. 20, 2022

(54) BATTERY

(71) Applicant: Johnson Matthey PLC, London (GB)

(72) Inventor: Rajlakshmi Purkayastha, Abingdon (GB)

(73) Assignee: Johnson Matthey PLC, London (GB)

( * ) Notice: Subject to any disclaimer, the term of this patent is extended or adjusted under 35 U.S.C. 154(b) by 236 days.

(21) Appl. No.: 16/347,567

(22) PCT Filed: Nov. 7, 2017

(86) PCT No.: PCT/GB2017/053334
§ 371 (c)(1),
(2) Date: May 3, 2019

(87) PCT Pub. No.: WO2018/087526
PCT Pub. Date: May 17, 2018

(65) Prior Publication Data
US 2019/0288352 A1    Sep. 19, 2019

(30) Foreign Application Priority Data

Nov. 8, 2016 (GB) .................... 1618806.2

(51) Int. Cl.
*H01M 10/613* (2014.01)
*H01M 4/38* (2006.01)
(Continued)

(52) U.S. Cl.
CPC ........... *H01M 10/613* (2015.04); *H01M 4/13* (2013.01); *H01M 4/134* (2013.01); *H01M 4/38* (2013.01);
(Continued)

(58) Field of Classification Search
CPC ............ H01M 10/613; H01M 10/651; H01M 10/654; H01M 10/655; H01M 2/02;
(Continued)

(56) References Cited

U.S. PATENT DOCUMENTS

2003/0113621 A1* 6/2003 Shimamura ....... H01M 10/6566
429/162
2007/0059599 A1* 3/2007 Rubino .............. H01M 4/5825
29/623.1
(Continued)

FOREIGN PATENT DOCUMENTS

DE     102008034860 A1    1/2010
EP         1655797 A1     5/2006
(Continued)

OTHER PUBLICATIONS

JP 2009176917 MT (Year: 2009).*
(Continued)

*Primary Examiner* — Alexander Usyatinsky
(74) *Attorney, Agent, or Firm* — BakerHostetler (57) ABSTRACT

The present disclosure relates to a battery comprising a housing defining an electrochemical zone, at least one electrode that comprises a conductive substrate, wherein the substrate comprises a first region in the electrochemical zone and a second region that protrudes from the electrochemical zone, and a contact tab that is coupled to the second region, wherein the ratio of the width of the second region to the width of the contact tab is greater than 1.

11 Claims, 6 Drawing Sheets

(51) Int. Cl.
| | |
|---|---|
| *H01M 10/651* | (2014.01) |
| *H01M 10/654* | (2014.01) |
| *H01M 10/655* | (2014.01) |
| *H01M 4/134* | (2010.01) |
| *H01M 4/66* | (2006.01) |
| *H01M 4/13* | (2010.01) |
| *H01M 10/6553* | (2014.01) |
| *H01M 50/531* | (2021.01) |
| *H01M 50/557* | (2021.01) |
| *H01M 10/647* | (2014.01) |
| *H01M 10/052* | (2010.01) |

(52) U.S. Cl.
CPC .......... *H01M 4/382* (2013.01); *H01M 4/661* (2013.01); *H01M 10/651* (2015.04); *H01M 10/654* (2015.04); *H01M 10/655* (2015.04); *H01M 10/6553* (2015.04); *H01M 50/531* (2021.01); *H01M 50/557* (2021.01); *H01M 10/052* (2013.01); *H01M 10/647* (2015.04)

(58) Field of Classification Search
CPC .......... H01M 2/26; H01M 4/134; H01M 4/38; H01M 4/66; H01M 4/661; H01M 2/0212; H01M 4/382; H01M 10/6553; H01M 4/13; H01M 10/052; H01M 10/647; Y02E 60/01

See application file for complete search history.

(56) References Cited

U.S. PATENT DOCUMENTS

| | | |
|---|---|---|
| 2007/0166611 A1 | 7/2007 | Oh et al. |
| 2010/0310910 A1* | 12/2010 | Huang .............. H01M 10/0569 429/94 |
| 2015/0064511 A1 | 3/2015 | Wang et al. |
| 2015/0064519 A1 | 3/2015 | Hong |
| 2015/0171431 A1 | 6/2015 | Yamada et al. |

FOREIGN PATENT DOCUMENTS

| | | | |
|---|---|---|---|
| EP | 2003722 A2 | | 12/2008 |
| JP | 2007188747 | * | 7/2007 |
| JP | 2007188747 A | | 7/2007 |
| JP | 2009176917 A | | 8/2009 |
| WO | WO 2005/013408 A1 | | 2/2005 |

OTHER PUBLICATIONS

JP2007188747 MT (Year: 2007).*
Combined Search and Examination Report under Sections 17 and 18(3) for Application No. GB1618806.2 dated Jun. 5, 2017, 6 pages.
Examination Report under Sections 18(3) for Application No. GB1618806.2 dated Sep. 6, 2019, 5 pages.
International Search Report and Written Opinion of the International Searching Authority for PCT/GB2017/053334 dated Jan. 4, 2018, 13 pages.
Japanese Office Action for patent application No. 2019-546097 dated Oct. 12, 2021, 2 pages.

* cited by examiner

BATTERY

BACKGROUND

This disclosure relates to a battery. This disclosure also relates to a method of removing heat from a battery.

BACKGROUND

A typical electrochemical cell comprises an anode, a cathode and an electrolyte disposed between the anode and cathode. The anode, cathode and electrolyte may be contained within a housing, for example, a pouch. The cell may have electrical connections, for example, contact tabs to provide electrical connection with the anode and cathode of the cell.

As the cell charges or discharges, its temperature may rise. In some instances, it may be desirable to ensure that the cell is operating at an optimum temperature range. The temperature of the cell may be reduced, for example, by allowing air to circulate around the cell. Since the electrical connections that are coupled to the cell housing are connected with the cell electrodes, these connections may also help to conduct heat out of the cell housing. By allowing air to circulate around the electrical connections, heat can also be removed from the cell.

BRIEF DESCRIPTION OF FIGURES

Aspects of the present disclosure are shown schematically, by way of example only, in the accompanying drawings, in which.

DESCRIPTION

Before particular examples of the present invention are described, it is to be understood that the present disclosure is not limited to the particular battery or method disclosed herein. It is also to be understood that the terminology used herein is used for describing particular examples only and is not intended to be limiting, as the scope In describing and claiming the battery and method of the present invention, the following terminology will be used: the singular forms "a", "an", and "the" include plural forms unless the context clearly dictates otherwise. Thus, for example, reference to "an anode" includes reference to one or more of such elements.

According to the present disclosure, there is provided a battery comprising a housing defining an electrochemical zone; at least one electrode that comprises a conductive substrate, wherein the substrate comprises a first region in the electrochemical zone and a second region that protrudes from the electrochemical zone, and a contact tab that is coupled to the second region, wherein the ratio of the width of the second region to the width of the contact tab is greater than 1.

As described above, the battery comprises a housing defining an electrochemical zone. Electrochemical reactions of the battery occur within this zone. Accordingly, at least part of the cell electrodes are present within the electrochemical zone. As the battery charges and/or discharges, heat may be generated within the electrochemical zone, causing the temperature of the cell to rise. Current flowing through and from the electrodes and contact tabs may also cause a temperature rise, for example, by Joule heating.

The battery of the present disclosure comprises at least one electrode that comprises a conductive substrate. This substrate comprises a first region in the electrochemical zone and a second region that protrudes from the electrochemical zone. Because the second region protrudes from the electrochemical zone, it is possible to conduct any unwanted heat away from the electrochemical zone via the conductive substrate. By coupling a contact tab to the second region, it is possible to conduct heat away from the conductive substrate via the contact tab. It has been found that, by controlling the ratio of the width of the second region of the conductive substrate to the width of the contact tab, the rate of heat removal from the battery can be further enhanced. In particular, by ensuring that the ratio of the width of the second region to the width of the contact tab is greater than 1, heat removal can be improved.

Preferably, the ratio of the width of the second region to the width of the contact tab is from greater than 1:1 to 7:1. More preferably, the ratio of the width of the second region to the width of the contact tab is from 2:1 to 5:1.

Conductive Substrate

The conductive substrate may take the form of a sheet, mesh or fabric of conductive material. The conductive material may comprise a metal, carbon and/or polymer. The first region and the second region may be part of the same conductive substrate. For example, where the conductive substrate is a sheet of metal or a sheet of wire mesh, the first region and second region may be part of the same sheet of metal or sheet of wire mesh.

In a preferred embodiment, the conductive substrate comprises metal. Suitable metals include alkali metals, for example, lithium and sodium. Other suitable metals include aluminium, nickel, magnesium, copper and stainless steel. The metal may take the form of a wire mesh or a metal sheet. Preferably, the conductive substrate comprises a metal sheet. The metal sheet may be a metal foil. The conductive substrate may be formed of a single metal sheet (e.g. foil) or may be formed of a plurality of sheets (e.g. of foil) that are joined together, for example, by welding.

Where the conductive substrate is formed of metal, the metal may be an electroactive material that is oxidised or reduced during the electrochemical cycle of the battery. In a preferred embodiment, the conductive substrate takes the form of a sheet (e.g. foil) formed of lithium or lithium metal alloy. The metal sheet may be an anode or cathode of a battery, preferably an anode of a battery, for example, a lithium battery (e.g. a lithium sulphur battery).

Instead of being a sheet of electroactive material, the conductive substrate may be a passive current collector that conducts current to and from electroactive material. The electroactive material may be in electrical contact with the current collector. For example, the electroactive material may be deposited on the current collector. In one example, the conductive substrate comprises current collector comprises a sheet formed of metal, for instance, aluminium, nickel or copper. In a preferred example, the current collector comprises aluminium foil. The current collector may be a current collector of an anode or cathode of a battery, preferably a cathode of the battery. For example, in one embodiment, the current collector is coated with an electroactive sulphur material and the resulting composite is used as the cathode of a lithium cell (e.g. a lithium sulphur cell).

The battery may comprise at least one cathode that comprises a conductive substrate and at least one anode that comprises a conductive substrate. Each conductive substrate comprises a first region in the electrochemical zone and a second region that protrudes from the electrochemical zone. A contact tab is coupled to each of the second regions, wherein the ratio of the width of the second region to the width of the contact tab is greater than 1.

The battery may comprise a plurality of conductive substrates. For example, the battery may comprise a conductive substrate for use as or as part of the anode and a conductive substrate for use as or as part of the cathode. Each conductive substrate may comprise a sheet of metal, for example, a sheet of metal foil. Each conductive substrate comprises a first region in the electrochemical zone and a second region that protrudes from the electrochemical zone. The second regions of two or more of the conductive substrates may be pressed or joined together to form a pile of second regions of the conductive substrates. Joining may be carried out by any suitable method including welding, soldering, riveting, crimping or clamping. Adhesives or fasteners, for example, screw tie holds may also be employed.

Once the second regions of the conductive substrates are joined together, the contact tab may be coupled to the pile. The contact tab may be positioned on the top, bottom or in an intermediate position in the pile. The ratio of the width of at least one of the second regions of the substrates in the pile to the width of the contact tab may be greater than 1. In one example, the ratio of the width of the pile of second regions to the width of the contact tab may be greater than 1.

The battery may comprise a first anode and a second anode, whereby each anode comprises a conductive substrate comprising a first region that is contained within the electrochemical chamber and a second region that protrudes beyond the electrochemical chamber. The second region of the first anode may be placed in contact with the second region of the second anode. The contact tab may be coupled to at least one of the second regions of the anodes. Where the battery comprises a plurality of anodes, the second region of the anodes may be pressed or coupled (e.g. welded or soldered) together to form a pile. The contact tab may be coupled to top, bottom or intermediate anode in this pile. As described below, the contact tab may be coupled by welding, an adhesive or soldering.

The battery may comprise a first cathode and a second cathode, whereby each cathode comprises a current collector comprising a first region that is contained within the electrochemical chamber and a second region that protrudes beyond the electrochemical chamber. The second region of the first cathode may be placed in contact with the second region of the second cathode. The contact tab may be coupled to at least one of the second regions of the cathodes. Where the battery comprises a plurality of cathodes, the second regions of the current collectors of each of the cathodes may be pressed or coupled (e.g. welded or soldered) together to form a pile. The contact tab may be coupled to top, bottom or intermediate current collector in this pile. As described below, the contact tab may be coupled by welding, an adhesive or soldering.

The conductive substrate may be a planar sheet of material. The conductive substrate may have a first planar region in the electrochemical zone and a second planar region that extends outside the electrochemical zone. The width of the first region may be the same as or greater than the width of the second region.

In one example, the first region may have a width of 3 to 50 cm, preferably 3 to 22 cm. The second region may have a width of 0.5 cm to 9 cm, preferably 1 to 4 cm. The length of the first region may be 3 to 50 cm, for example, 3.0 to 22 cm. The length of the second region of may be 0.3 to 3 cm, for example, 0.4 to 1 cm. The ratio of the length of the first region to the length of the second region may be 1:1 to 170:1, for example, 9:1 to 35:1. The ratio of the width of the first region to the width of the second region may be 1:1 to 100:1, for example, 1:1 to 10:1.

The thickness of the second region may be 0.001 to 0.4 mm, for example, 0.005 to 0.2 mm. Where a plurality of second regions are pressed or joined together to form a pile that is coupled to a contact tab, the pile may have a thickness of 0.001 to 15 mm, for example, 0.03 to 8 mm.

The second region of the conductive substrate may protrude from the electrochemical zone but may still be isolated from the surrounding atmosphere. This may be important, for example, where the second region of the conductive substrate is formed from an air (and/or moisture)-sensitive material, for example, lithium or sodium. For example, the second region may protrude from the electrochemical zone but may still be contained within the housing, for example, in a sealed region or in the seal of the housing.

Contact Tab

The battery comprises a contact tab that is coupled to the second region of the conductive substrate. The contact tab may be formed of a thermally and electrically conductive material. In one example, the contact tab is formed of metal. Examples of suitable metals include aluminium, nickel and copper. In a preferred embodiment, the contact tab may be formed of nickel or aluminium. In one embodiment, a nickel contact tab may be coupled to the second region of a conductive substrate formed, for example, lithium. In another embodiment, an aluminium contact tab may be coupled to the second region of a conductive substrate formed, for example, of an aluminium current collector.

The contact tab may be coupled to the second region of the conductive substrate by, for example, a conductive adhesive or soldering. Other methods include riveting, crimping or clamping. Adhesives or fasteners, for example, screw tie holds may also be employed. Alternatively, the electrical connections may be welded (e.g. ultrasonically- or laser-welded) to the second region of the conductive substrate. The join between the second region of the conductive substrate and the contact tab may be present outside the electrochemical zone but still within a sealed region of the housing. This may be important, for example, where the second region of the conductive substrate is formed of an air (and/or moisture)-sensitive material (e.g. lithium).

The ratio of the width of the second region to the width of the contact tab is greater than 1, preferably greater than 1:1 to 7:1. More preferably, the ratio of the width of the second region to the width of the contact tab is from 2:1 to 5:1.

The contact tab may have a width of 0.5 to 8 cm, preferably 1 to 4 cm. The length of the contact tab may be 1 to 8 cm, for example, 2 to 6 cm.

The thickness of the contact tab may be 0.05 to 1 mm, for example, 0.1 to 0.4 mm. The ratio of the thickness of the contact tab to the thickness of the second region of the conductive substrate(s) to which the contact tab is connected is 0.01:1 to 10:1.

As current flows in and out of the cell through the contact tab, the temperature of the contact tab may rise through Joule heating.

Housing

The battery includes a housing that defines the electrochemical zone. As explained above, this is the zone in which electrochemical reactions of the cell occur. The housing may take any form. For example, the housing may be a pouch or cylindrical housing. In one example, the housing may take the form of a flexible pouch. The flexible pouch may be formed of a composite, for example, of metal and polymer.

The housing may comprise a seal and enclose the first region of the conductive substrate(s) to define an electrochemical zone. The second region of the conductive substrate may protrude into or even beyond the seal. In one example, the second region of the conductive substrate protrudes into the seal and overlaps the contact tab in the region of the seal.

Lithium Sulphur Battery

The battery may be any suitable battery. The battery may comprise one or more electrochemical cells sealed in a housing. Each electrochemical cell may comprise an anode and a cathode, and an electrolyte present between the anode and the cathode. The anode and cathode may each comprise a first region contained in the electrochemical zone and a second region that protrudes from the electrochemical zone.

Where a plurality of electrochemical cells are present in the battery, the second region of each of the anodes may be pressed or coupled together to form a pile of anodes that is connected to a contact tab. The second region of each of the cathodes of the battery may be pressed or coupled together to form a pile that is connected to a further contact tab. The join or overlap between the contact tabs and their respective piles of anodes and cathodes may be contained within the seal of the housing. This may help to avoid the anodes and cathodes coming into contact with the surrounding air.

The battery may contain any suitable electrochemical cell. In some examples of the disclosure, the electrochemical cells are lithium cells. Suitable lithium cells include lithium-ion, lithium-air, lithium-polymer and lithium-sulphur cells.

In a preferred embodiment, the battery is a lithium sulphur battery.

Where the battery is a lithium cell (e.g. a lithium sulphur cell), the anode may comprise a conductive substrate that is in the form of a sheet of lithium metal or lithium metal alloy. This sheet may be coupled to a contact tab formed, for example, of nickel. The contact tab may be coupled to the sheet of lithium metal or lithium metal alloy by welding, for instance, ultrasonic welding.

The cathode may comprise a current collector on to which an electroactive material is deposited. The current collector may be formed of a metal foil, for example, aluminium foil. The electroactive material may comprise an electroactive sulphur material, which may be mixed with an electrically conductive material. The resulting mixture may be coated onto the current collector as an electroactive matrix. A contact tab formed, for example, by aluminium may be coupled to the current collector. This coupling may be carried out by welding, for example, ultrasonic welding.

The electroactive sulphur material deposited on the current collector may comprise elemental sulphur, sulphur-based organic compounds, sulphur-based inorganic compounds and sulphur-containing polymers. Preferably, elemental sulphur is used.

The electrically conductive material may be any suitable solid electrically conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Preferably, carbon black is employed.

The electroactive sulphur material may be present in the matrix deposited on the current collector in an amount of 60 to 90 weight %, preferably 65 to 85 weight %, more preferably 70 to 80 weight %.

The electrically conductive material may be present in the matrix deposited on the current collector in an amount of 10 to 45 weight %, preferably 15 to 35 weight %, more preferably 20 to 25 weight %.

The weight ratio of electroactive sulphur material to electrically conductive material may be 0.01-10: 10-50, preferably 0.1-5: 15-45, more preferably 1-5:20-35.

The battery may further comprise an electrolyte in contact with the anode and the cathode. Any suitable electrolyte may be used. The electrolyte may comprise an organic solvent and a lithium salt. Suitable organic solvents include ethers, esters, amide, amine, sulfoxides, sulfamides, organophosphates and sulfones. Examples include tetrahydrofuran, 2-methyltetrahydrofuran, methyl propylpropionate, ethyl-propylpropionate, methyl acetate, 1,2-dimethoxyethane, 1,3-dioxolane, diglyme (2-methoxyethyl ether), triglyme, tetraglyme, butyrolactone, 1,4-dioxane, 1,3-dioxane, hexamethyl phosphoamide, pyridine, dimethyl sulfoxide, tributyl phosphate, trimethyl phosphate, N, N, N, N-tetraethyl sulfamide, and sulfones and their mixtures.

Suitable electrolyte salts include lithium salts. Suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate. Preferably the lithium salt is lithium trifluoromethanesulphonate (also known as lithium triflate). Combinations of salts may be employed. For example, lithium triflate may be used in combination with lithium nitrate. The lithium salt may be present in the electrolyte at a concentration of 0.1 to 5M, preferably, 0.5 to 3M.

A separator may be placed between the anode and cathode. Where a separator is present, the separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

Figure 1:
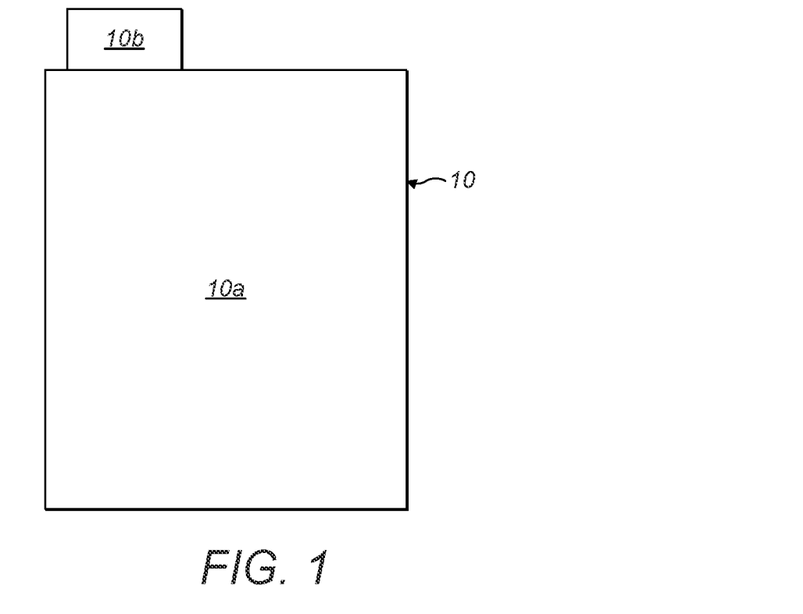
FIG. 1 is plan view of an anode employed in a battery according to an example of the present disclosure.

Aspects of the present invention will now be described with reference to the drawings in which:

FIG. 1 is a plan view of an anode 10 for a lithium sulphur battery. The anode takes the form of a planar sheet of lithium foil. The sheet comprises a first region 10a and a narrower, second region 10b.

Figure 2:
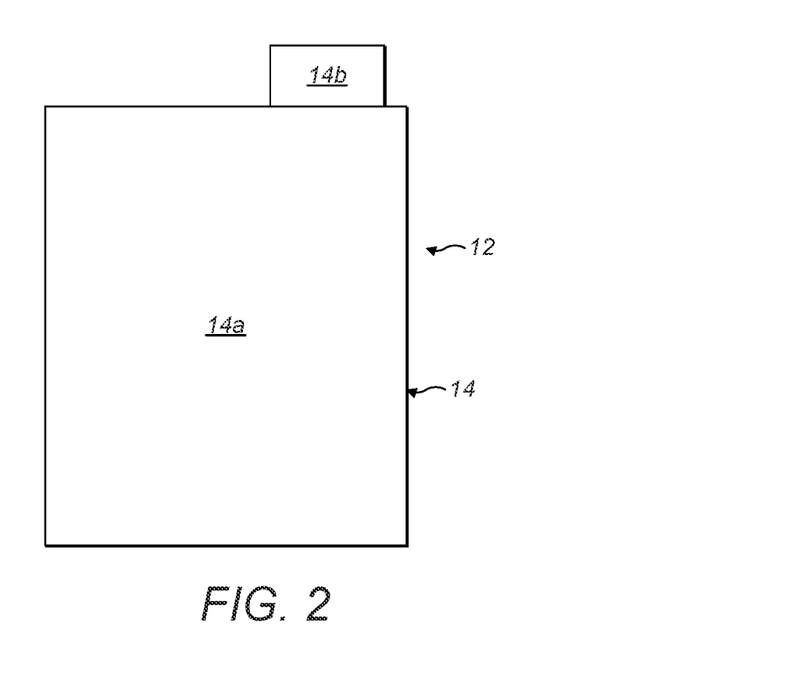
FIG. 2 is a plan view of a cathode employed in a battery according to an example of the present disclosure.

FIG. 2 is a plan view of a cathode 12 for a lithium sulphur battery. The cathode takes the form of a current collector 14 formed of a planar sheet of aluminium foil. Deposited on a first region 14a of the current collector is an electroactive matrix comprising elemental sulphur, carbon and binder. The current collector 14 also comprises a second region 14b that is narrower than the first region 14a.

Figure 3:
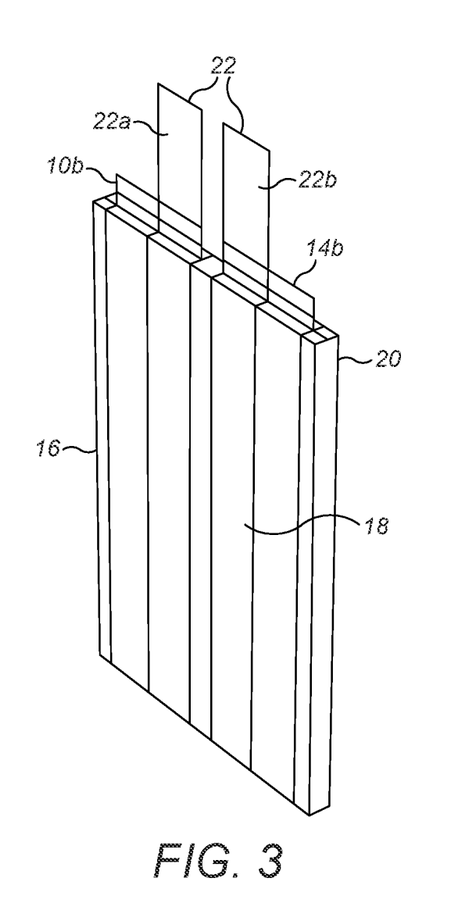
FIG. 3 is an isometric view of a battery according to an example of the present disclosure.

FIG. 3 is an isometric view of a lithium sulphur battery 16 comprising a pouch 18 that defines an electrochemical zone. The battery 16 comprises the anode 10 and cathode 12. The first regions 10a, 14a of the anode 10 and cathode 12 are contained within the electrochemical zone, while the second regions 10b, 14b protrude from the electrochemical zone. The first regions 10a, 14a of anode 10 and cathode 12 are arranged so that they oppose one another, with the electroactive matrix of the cathode 12 facing the anode 10. An electrolyte-soaked separator (not shown) is positioned between the anode 10 and cathode 12.

The second regions (or "protrusions") 10b, 14b extend beyond the electrochemical zone but are contained within a seal 20 in the housing 18, such that they are kept from contact with the surrounding atmosphere.

The protrusions 12b, 14b are coupled to contact tabs 22. The contact tab 22a that is coupled to the protrusion 10b of the anode is formed of nickel, while the contact tab 22b that is coupled to the protrusion 14b of the cathode is formed of aluminium. The contact tabs 22a, 22b are ultrasonically welded to the protrusions 10b, 14b.

As shown in FIG. 3, the widths of the protrusions 10b, 14b are greater than the widths of the contact tabs 22a, 22b.

When a current is drawn or introduced into the battery, the temperature of the anode 10, cathode 12 and contact tabs 22 rise e.g. because of Joule heating. Heat can be conducted out of the electrochemical zone via the protrusions 10b, 14b and away from the remainder of the battery via the contact tabs 22. By controlling the width of the protrusions 10b, 14b relative to the width of the contact tabs 22, the rate of heat removal may be controlled.

Figure 4:
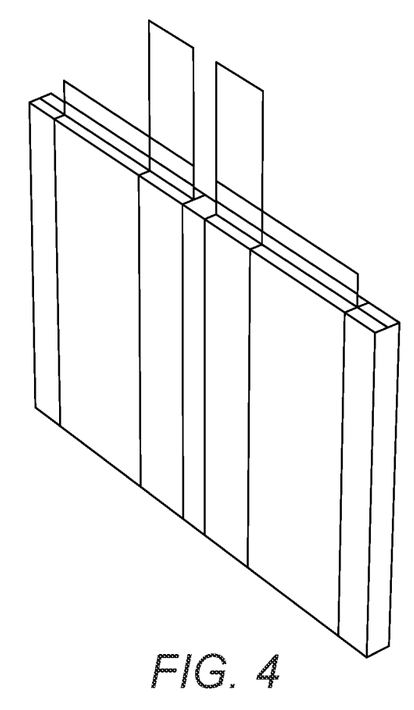
FIG. 4 is an isometric view of a battery according to a further example of the present disclosure.

FIG. 4 depicts a variation of the battery shown in FIG. 3. In the cell of FIG. 4, the aspect ratio of the length of the cell to the width of the cell is less than 1.

Whilst specific examples of batteries are shown in the drawings and is described above, it will be appreciated that other examples of the invention are envisaged. For example, the battery may include a stack of a plurality of electrochemical cells, each cell having its own anode 10 and cathode 12. The second regions of the anodes may be pressed together to form a protrusion that is coupled to one of the contact tabs, while the second regions of the cathodes may be pressed together to for a protrusion that is coupled to the other contact tab.

Example 1

Figure 5:
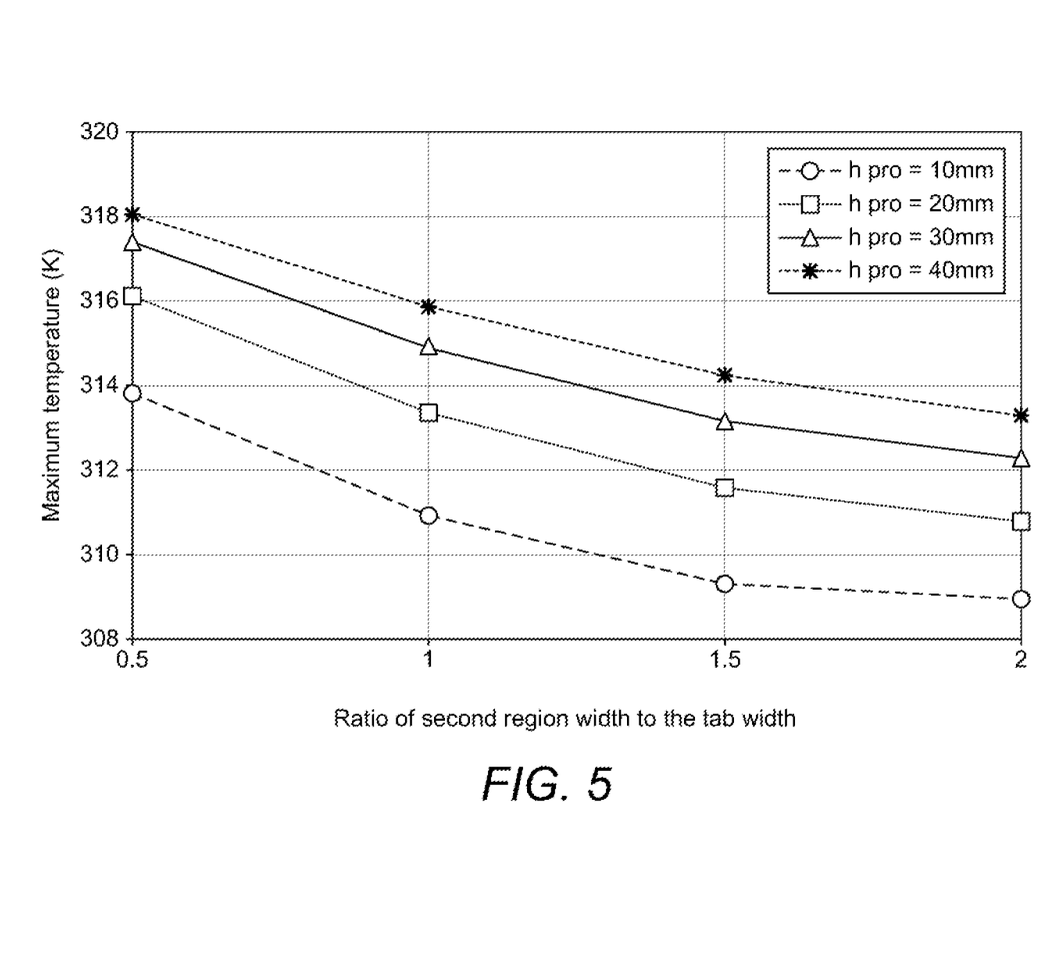
FIGS. 5 and 6 are graphs showing the results of Example 1.
Figure 6:
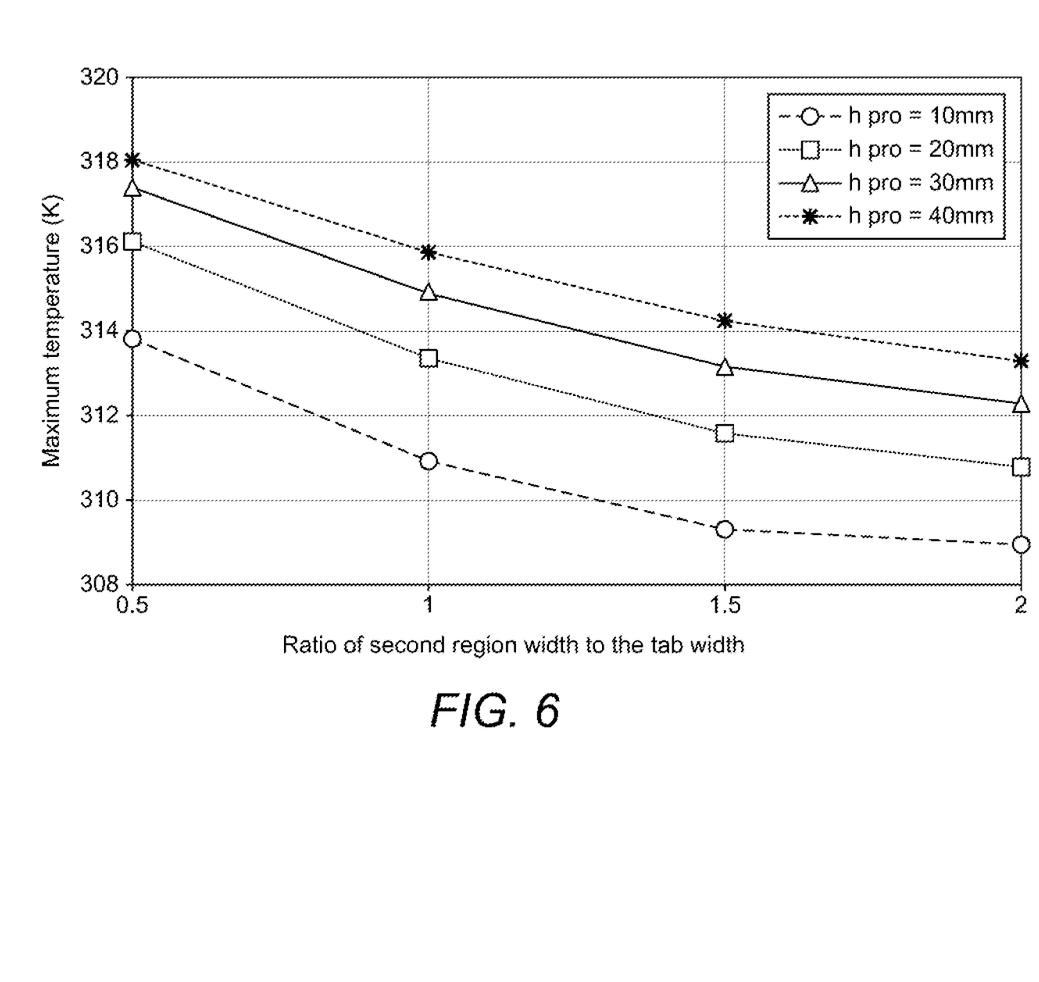

In this example a simulation was performed on a battery having the configuration shown in FIG. 3 to investigate the effect of varying the dimensions of the protrusions 10b, 14b and contact tabs 22a, 22b on the temperature in the electrochemical zone. Simulations were performed with the height of the protrusions (h_pro) of regions 10b and 14b kept constant at 10 mm, 20 mm, 30 mm and 40 mm, respectively.

in FIG. 5, the electrochemical zone was assumed to be the prime source of heat, although in FIG. 6 Joule heating was also assumed to occur in the contact tabs 22a, 22b because of the passage of current. Heat loss was assumed to occur solely through the protrusions 10b, 14b and contact tabs 22a, 22b. The surfaces of the contact tabs 22a, 22b were assumed to be at a constant temperature.

As can be seen from FIGS. 5 and 6, the maximum temperature of the electrochemical zone is greatest when the ratio of the protrusion width to contact tab width is less than 1. As the width of the protrusion increases relative to the width of the contact tab, the maximum temperature of the electrochemical zone decreases by more than 3 degrees C. This demonstrates an improvement in heat loss. The ratio of the protrusion width to contact tab width improves as the ratio exceeds 1 and is optimised at about a ratio of 2.

Example 2

Figure 7:
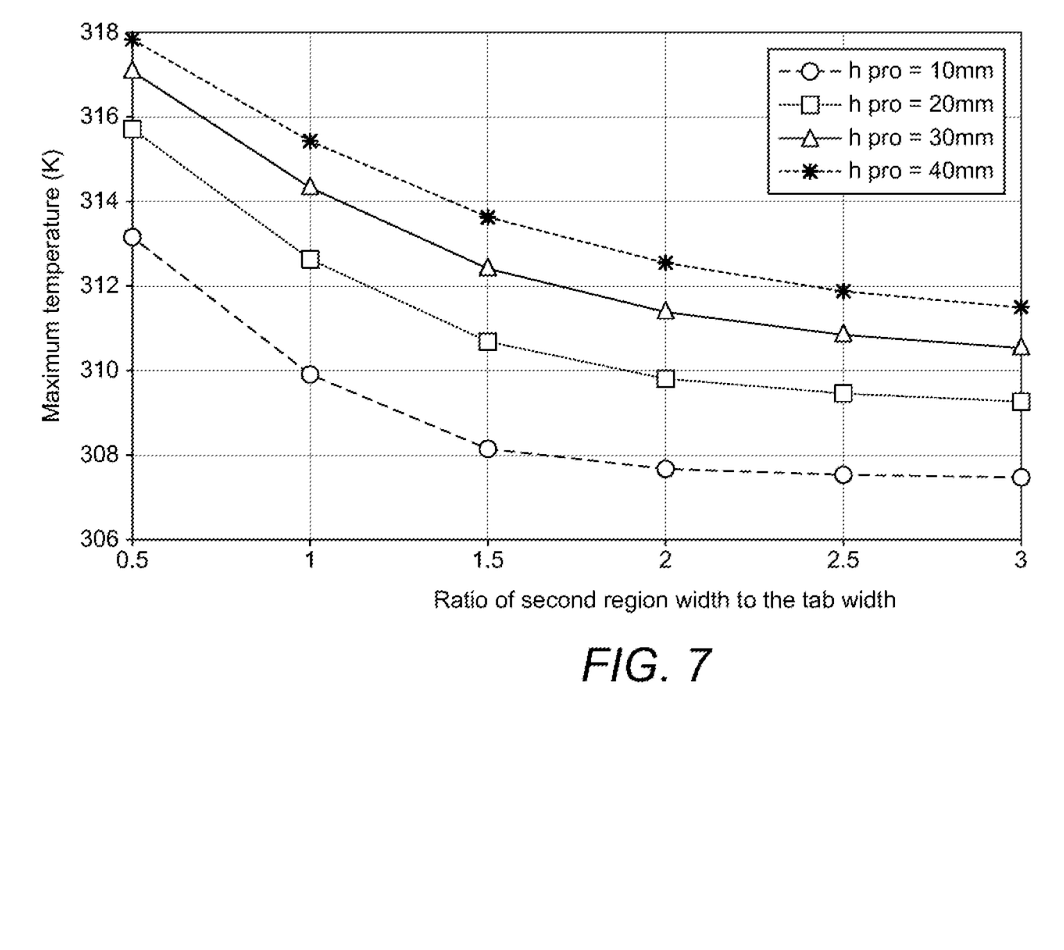
FIG. 7 is a graph showing the results of Example 2.
Figure 8:
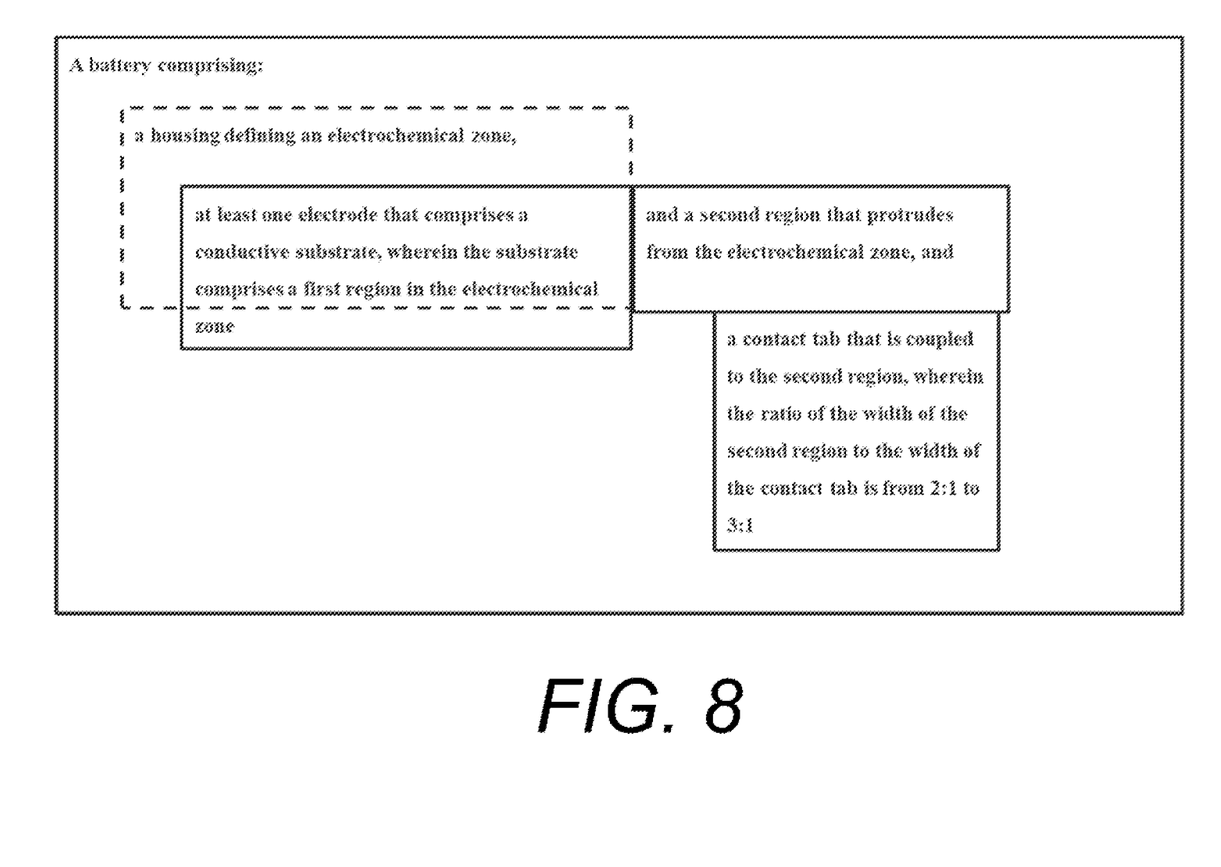
FIG. 8 is a view of a battery according to a further example of the present disclosure.

The simulation of Example 1 was repeated with a battery having the configuration shown in FIG. 4. As can be seen from FIG. 7 a trend similar to that described in relation to Example 1 is observed. The ratio of the protrusion width to contact tab width improves as the ratio exceeds 1 and is optimised at about a ratio of 2. As the ratio increases beyond 5, the temperature appears to plateau. In the simulation o FIG. 7, the electrochemical zone was assumed to be the prime source of heat, although Joule heating was also assumed to occur in the contact tabs 22a, 22b because of the passage of current.

The invention claimed is:

1. A battery comprising
a housing defining an electrochemical zone,
at least one electrode that comprises a conductive substrate, wherein the substrate comprises a first region in the electrochemical zone and a second region that protrudes from the electrochemical zone, and
a metal contact tab that is coupled to the second region, wherein the ratio of the width of the second region to the width of the contact tab is from 2:1 to 3:1;
wherein the contact tab provides electrical connection with the electrode; wherein current flows in and out of the electrode through the contact tab during charge, during discharge, or both during charge and discharge of the battery, and wherein the contact tab conducts heat away from the conductive substrate;
wherein the conductive substrate is a metal sheet that is a sheet of metal foil;
and wherein the battery comprises at least one electrode that is an anode comprising a conductive substrate that is in the form of a sheet of lithium metal or lithium metal alloy.

2. A battery as claimed in claim 1, wherein the width of the second region is less than or equal to the width of the first region.

3. A battery as claimed in claim 1, wherein the contact tab is formed from nickel foil, and the nickel foil is coupled to the sheet of lithium foil by a weld.

4. A battery as claimed in claim 1, wherein the cell comprises at least one cathode that comprises a current collector in the form of a sheet of aluminium foil, whereby a cathode active material is deposited onto at least part of the first region of the sheet of aluminium foil.

5. A battery as claimed in claim 4, wherein the cathode active material comprises a matrix comprising an electroactive sulphur material and an electrically conductive material.

6. A battery as claimed in claim 4, wherein the contact tab formed of aluminium foil and the aluminium foil of the contact tab is coupled to the aluminium foil of the cathode by a weld.

7. A battery as claimed in claim 1,
wherein the at least one electrode comprises a first anode and a second anode, wherein the conductive substrate comprises a metal sheet; wherein the first region is contained within the electrochemical zone and the second region protrudes beyond the electrochemical zone.

8. A battery as claimed in claim 1, wherein the at least one electrode comprises a first cathode and a second cathode, wherein the conductive substrate comprises a current collector; wherein the first region is contained within the electrochemical zone and the second region protrudes beyond the electrochemical zone.

9. A battery as claimed in claim 1, wherein the housing has a sealed region, whereby the second region of the conductive substrate protrudes from the electrochemical zone into the sealed region, and whereby the contact tab is coupled to and overlaps with the second region of the metal sheet in the sealed region.

10. A battery as claimed in claim 1, wherein the housing a flexible pouch.

11. A method of removing heat from an electrochemical cell, said method comprising
providing an electrochemical battery comprising a housing defining an electrochemical zone, at least one electrode that comprises a conductive substrate, wherein the conductive substrate comprises a first region in the electrochemical zone and a second region that protrudes from the electrochemical zone, and
coupling a metal contact tab to the second region, wherein the ratio of the width of the second region to the width of the contact tab is from 2:1 to 3:1;
wherein the contact tab provides electrical connection with the electrode; wherein current flows in and out of the electrode through the contact tab during charge, during discharge, or both during charge and discharge of the battery, and wherein the contact tab conducts heat away from the conductive substrate;
wherein the conductive substrate is a metal sheet that is a sheet of metal foil;
and wherein the battery comprises at least one electrode that is an anode comprising a conductive substrate that is in the form of a sheet of lithium metal or lithium metal alloy.

* * * * *